United States Patent [19]

Rhoades

[11] Patent Number: 5,601,670
[45] Date of Patent: Feb. 11, 1997

[54] FLEXIBLE AND NON-WATER ABSORBING INSULATION SYSTEM

[75] Inventor: George D. Rhoades, LaGrange, Ill.

[73] Assignee: Liquid Carbonic Corporation, Oak Brook, Ill.

[21] Appl. No.: 458,447

[22] Filed: Jun. 2, 1995

Related U.S. Application Data

[63] Continuation of Ser. No. 152,855, Nov. 15, 1993, abandoned.

[51] Int. Cl.$^6$ ............................................. B29C 65/00
[52] U.S. Cl. ..................... 156/80; 156/90; 156/184; 156/185; 156/187
[58] Field of Search .................... 156/60, 80, 90, 156/184, 185, 187, 212, 230, 307.3; 428/35.7, 36.5, 36.9, 36.91, 36.92, 304.4, 304.5, 308.4, 314.4, 315.9, 328.4, 40

[56] References Cited

U.S. PATENT DOCUMENTS

| | | | |
|---|---|---|---|
| 3,538,956 | 11/1979 | Helbing et al. | 138/120 |
| 4,121,962 | 10/1978 | Hopkins | 156/272 |
| 4,239,064 | 12/1980 | Gilman | 138/154 |
| 4,246,057 | 1/1981 | Janowski et al. | 156/150 |
| 4,271,218 | 6/1981 | Heckel et al. | 428/36 |
| 4,300,963 | 11/1981 | Berg | 156/82 |
| 4,347,090 | 8/1982 | Anderson et al. | 156/149 |
| 4,372,796 | 2/1983 | Greuel, Jr. | 156/187 |
| 4,567,091 | 1/1986 | Spector | 428/222 |

*Primary Examiner*—James J. Seidleck
*Assistant Examiner*—Michael A. Williamson
*Attorney, Agent, or Firm*—Fitch, Even, Tabin & Flannery

[57] ABSTRACT

A flexible, non-water absorbing insulation system is described for insulating articles exposed to relatively cold temperatures. This insulation system is especially adapted for insulating delivery or transfer hoses used with cryogenic liquid transfer operations. The insulating material is a thermoplastic sheet-like layer having gas-filled cells to which is attached or bonded to a metallized thermoplastic film. In one embodiment, the metallized thermoplastic material is bonded to the smooth side of the thermoplastic sheet-like material. In another embodiment, metallized thermoplastic material is bonded to both sides of the cell-containing thermoplastic material. The sheet-like insulating material is wrapped at least twice around the hose or article to be insulated. Slits may be cut in the insulating material to make the hose self draining whereby any condensed water can gravity drain once the temperature is above the freezing point of water. The wrapped hose may also be wrapped or encased in a flexible protective material such as leather, fabric, or knitted material.

30 Claims, 3 Drawing Sheets

FLEXIBLE AND NON-WATER ABSORBING INSULATION SYSTEM

This is a continuation of application Ser. No. 0/152,855, filed Nov. 15, 1993 now abandoned.

FIELD OF THE INVENTION

This invention provides a flexible, non-water absorbing, cryogenic insulation system. This insulation system is generally suited for insulating materials from about 100° F. to cryogenic temperatures. This system is especially adapted for insulating delivery or transfer hoses used with cryogenic liquid transfer operations.

BACKGROUND OF THE INVENTION

Transfer or delivery hoses for cryogenic liquids such as liquified natural gas are normally insulated to least minimize heat transfer from the ambient environment to the cryogenic liquid and to protect the operator from the cold temperatures normally encountered. Because of the wide temperature changes during cool-down and warm-up cycles and the number of such cycles, condensation of water within the insulation can be a significant problem. Such condensation within the insulation can significantly reduce, and even destroy, the insulating properties of many insulating materials. Such condensation within the insulation can also significantly increase the cool-down refrigeration requirements by requiring the water trapped within the insulation to be refrozen during every cool-down cycle. Such condensation can also significantly reduce the flexibility of the transfer or delivery hose due to ice formation within the insulation. Such a "frozen" hose and insulating system, if forced into a different configuration by an operator, can be damaged or even destroyed.

Attempts to prevent the condensation of water within the insulation have usually involved the use of vapor barriers over the insulation to prevent water from entering the insulation. Such vapor barriers, however, break down over time and allow moisture to enter the insulation. The insulation may become saturated with water, thereby significantly reducing the effectiveness of the insulation. Once the insulation becomes wet, the vapor barrier will tend to trap moisture within the insulation and make it very difficult, if not impossible, to dry the insulation. Thus, once the insulation is saturated, it may become necessary to replace the insulation or scrap the hose assembly. Vapor barriers used in cryogenic liquid transfer operations generally break down especially quickly due to the wide temperature swings, the repeated flexing of the hose and insulation material, and the numerous cool-down cycles normally associated with such operations. Thus, and especially when used with cryogenic liquids, the use of vapor barriers to prevent water from entering the insulation has not been as successful as desired.

Metal vapor barriers have also been used to prevent water from saturating the insulation in cryogenic liquid transfer operations. Such vapor barriers generally are constructed with an outer surface of a relatively flexible metal material. But as the thickness of the vapor barrier increases, its flexibility generally decreases. Metal vapor barriers with sufficient flexibility are generally very expensive to produce. Furthermore, insulating systems using such metal vapor barriers cannot easily be adapted for differing hose configurations often found in the field. Metal sheaths used as vapor barriers can also significantly increase the weight of the delivery hose system.

Even where effective vapor barriers are provided, moisture will eventually find its way into the insulation through weak points in the system (e.g., joints, points of attachment of the hose to the storage unit or nozzle, and the like). Such moisture will build up within the insulation over time due largely to the effectiveness of the vapor barrier in preventing the trapped moisture from escaping. Thus, over time the effectiveness of the insulation can be destroyed even though the vapor barrier remains intact.

Vacuum jacketed hoses generally provide excellent insulation but are heavier, stiffer, and much more expensive than conventional single hoses. Furthermore, such vacuum jacketed hoses cannot easily be repaired in the field. Their use in cryogenic liquid transfer is, therefore, limited to special applications.

It would be desirable, therefore, to provide a flexible, lightweight, non-water absorbing insulation material for use in cold liquid transfer operations and especially in cryogenic liquid transfer operations. It would also be desirable to provide an insulation system which would allow any condensed water to gravity drain from the system. It would also be desirable to provide an inexpensive insulation system which can be easily adapted in the field for installation in widely differing liquid transfer systems and which can easily be repaired in the field. The present invention provides such an insulation system.

SUMMARY OF THE INVENTION

This invention provides a lightweight, flexible, non-water absorbing insulation system. This insulation system is especially adapted for insulating delivery or transfer hoses used with cryogenic liquid transfer operations, including cryogenic methane (i.e., liquified natural gas) transfer operations. The insulation is designed to be applied by wrapping around, or otherwise layering upon, a hose or other object to be insulated. The insulation system of the present invention generally provides superior performance as compared to other "wrap-on" type cold insulation systems used in the refrigeration and air conditioning industry.

The present invention employs as the insulating material a thermoplastic sheet-like layer having gas-filled cells to which a metallized thermoplastic film is attached or bonded.

Figure 1:
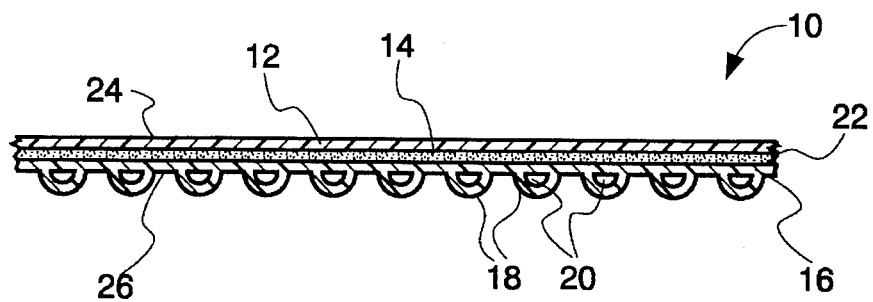
FIG. 1 is a cross-sectional view which generally illustrates one embodiment of the insulating sheet-like material of this invention.
Figure 3:
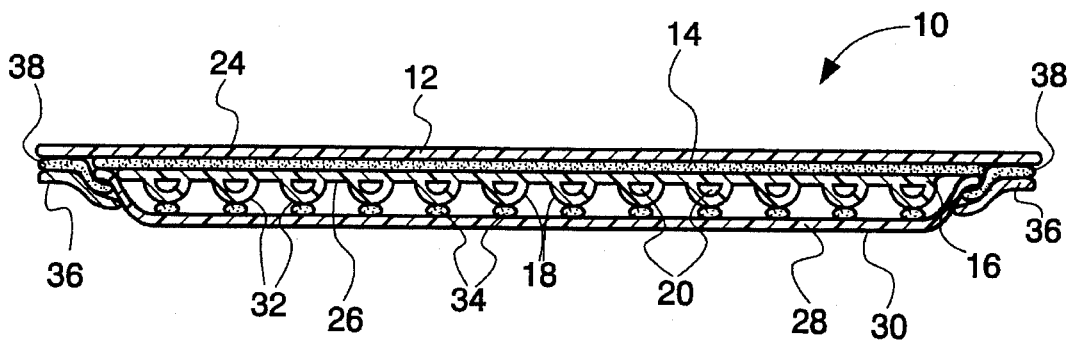
FIG. 3 is a cross-sectional view which generally illustrates another embodiment of the insulating sheet-like material of this invention.

In one embodiment, the metallized thermoplastic material is bonded to the smooth side of a cell-containing thermoplastic material as illustrated in FIG. 1. In another embodiment, metallized thermoplastic layers are attached to both sides of a cell-containing thermoplastic material as illustrated in FIG. 3. The resulting sheet-like insulating materials are wrapped or layered around the hose or article to be insulated to form at least two wraps or layers of the sheet-like insulating material. For sheet-like insulating materials having only one attached metallized layer, the wrapping or layering should be such that, for each wrap or layer of the insulating material, the gas-filled cells are adjacent to the hose or article to be insulated. Preferably, holes, slots, or slits are provided in the wrapped insulating material on the underside of the article being insulated to allow condensed moisture to gravity drain from the insulation once the temperature within the insulation is above the freezing point of water. If desired, a protective material, such as leather, fabric, or knitted material, can be wrapped or placed around the insulated hose to provide abrasion protection as well as improved comfort and handling characteristics for the operator during use.

One object of the present invention is to provide a method for thermally insulating an article, said method comprising wrapping the exposed surfaces of the article to be insulated with at least two wraps of a flexible sheet material having (1) a first thermoplastic sheet-like layer having gas-filled cells formed in one planar surface and a relatively smooth surface as the second and opposite planar surface, (2) a second metallized thermoplastic sheet-like layer, and (3) a bonding layer interdisposed between and directly contacting both the relatively smooth surface of the first layer and the second layer for bonding the first and second layers to each other, whereby the exposed surfaces of the article are wrapped with the flexible sheet material such that, for each wrap, the gas-filled cell surface of the first layer is located in closer proximity to the exposed surface of the article than the second layer bonded to that first layer.

Another object of the present invention is to provide a method for thermally insulating an article, said method comprising wrapping the exposed surfaces of the article to be insulated with at least two wraps of a flexible sheet material having (1) a middle thermoplastic sheet-like layer having gas-filled cells formed in one planar surface and a relatively smooth surface as the second and opposite planar surface, (2) a first metallized thermoplastic sheet-like layer bonded directly to the relatively smooth surface of the middle layer, and (3) a second metallized thermoplastic sheet-like layer bonded directed to the cell-containing surface of the middle layer, whereby the exposed surfaces of the article are wrapped with the flexible sheet material.

Another object of the present invention is to provide an insulated hose assembly for delivery of a cryogenic liquid from a storage unit, said assembly comprising a nozzle, a flexible hose connected at one end to the nozzle and at the other end to the storage unit, and a insulating member covering the outside surface of the hose, whereby the cryogenic liquid can be delivered from the storage unit through the hose and nozzle, wherein the insulating member is formed from at least two wraps of a flexible sheet material having (1) a first thermoplastic sheet-like layer having gas-filled cells formed in one planar surface and a relatively smooth surface as the second and opposite planar surface, (2) a second metallized thermoplastic sheet-like layer, and (3) a bonding layer interdisposed between and directly contacting both the relatively smooth surface of the first layer and the second layer for bonding the first and second layers to each other, whereby the hose is wrapped with the flexible sheet material such that, for each wrap, the gas-filled cell surface of the first layer is located in closer proximity to the hose than the second layer bonded to that first layer.

Still another object of the present invention is to provide an insulated hose assembly for delivery of a cryogenic liquid from a storage unit, said assembly comprising a nozzle, a flexible hose connected at one end to the nozzle and at the other end to the storage unit, and a insulating member covering the outside surface of the hose, whereby the cryogenic liquid can be delivered from the storage unit through the hose and nozzle, wherein the insulating member is formed from at least two wraps of a flexible sheet material having (1) a middle thermoplastic sheet-like layer having gas-filled cells formed in one planar surface and a relatively smooth surface as the second and opposite planar surface, (2) a first metallized thermoplastic sheet-like layer bonded directly to the relatively smooth surface of the middle layer, and (3) a second metallized thermoplastic sheet-like layer bonded directed to the cell-containing surface of the middle layer, whereby the exposed surfaces of the article are wrapped with the flexible sheet material.

These and other objects and advantages of the present invention will become apparent through the following description of the preferred embodiments of the invention and the detailed description of the drawings.

DESCRIPTION OF THE PREFERRED EMBODIMENTS

Figure 2:
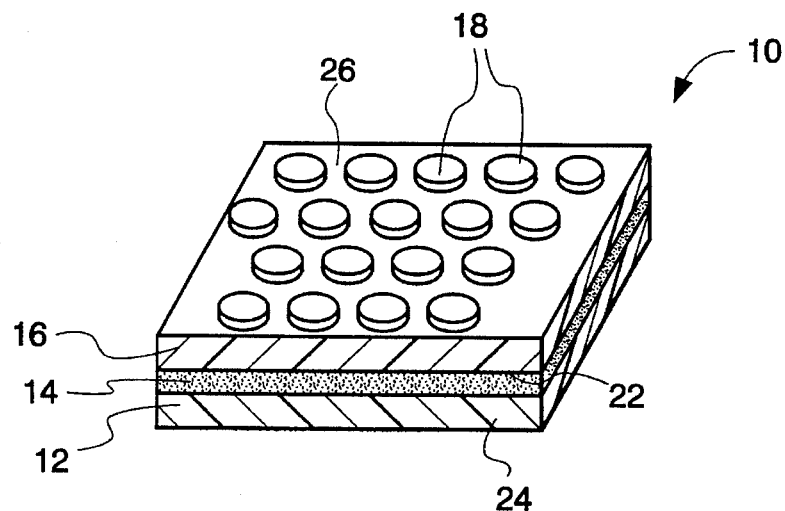
FIG. 2 is a perspective view of the insulating sheet-like material of FIG. 1.

FIGS. 1, 2, and 3 generally illustrate the sheet-like insulating materials or members used in the present invention. In FIGS. 1 and 2, the sheet-like insulating material 10 has a metallized thermoplastic layer 12 which is adhesively bonded to the smooth side 22 of a thermoplastic sheet-like layer 16 having gas-filled cells 18 with internal, gas-filled chambers 20. Preferably chambers 20 are air-filled. The smooth surface 22 of the layer 16 is bonded to layer 12 via adhesive layer 14. Preferably the gas-filled cells 18 are symmetrical, spherical-shaped bubbles as shown in FIG. 2.

In FIG. 3, the sheet-like insulating material 10 has a first metallized thermoplastic layer 12 which is adhesively bonded to the smooth side 22 of a thermoplastic sheet-like layer 16 having gas-filled cells 18 with internal, gas-filled chambers 20 and a second metallized thermoplastic layer 28 which is adhesively bonded to the cell-containing side 32 of layer 16. The first thermoplastic layer 12 in FIG. 3 is attached in the same manner as described for FIGS. 1 and 2. The second layer 28 is attached to the outer surface 32 of the cells 18 in the cell-containing layer 16 through adhesive layer 34. Although adhesive layer 34 in FIG. 3 is shown only on the outer surface of the cells, this adhesive layer could be in the form of a continuous layer on the inner surface of metallized layer 28.

FIG. 3 also illustrates a modification of the insulating material 10 whereby it can readily be attached to an article to be insulated. Metallized thermoplastic layer 12 can be extended pass the edges of cell-containing layer 16 to provide a surface for adhesive 38 which is suitable for bonding the insulating sheet to the article to be insulated and earlier layers of the insulating sheets already wrapped around the article. If desired, metallized layer 28 or both metallized layers 12 and 28 could be extended in a similar manner. Preferably adhesive 38 is protected by release sheet 36. When the insulating material 10 is applied to an article to be insulated, release sheet 36 can be pealed away to expose the adhesive layer 38. Preferably, adhesive layer 38 is a pressure sensitive adhesive. Although not shown, the insulating sheet of FIG. 1 can be modified in a similar manner by extending the metallized sheet 12 past the edge of the cell-containing sheet 16. In such case, the adhesive (preferably with a release sheet) should be placed on the same side of the metallized layer 12 as is the cell-containing layer 16. Although not shown in the Figures, adhesive 38 and release sheet 36 can be placed in locations other than the edges (as shown in FIG. 3) if desired.

When used as an insulating material, the sheet-like insulating material 10 is wrapped at least twice around the article. When only one metallized thermoplastic layer is attached to the cell-containing layer (as shown in FIGS. 1.and 2), the cell-containing surface 26 is placed, in the first wrap, adjacent to the article (i.e., hose) to be insulated and the metallized surface 24 forms the outside surface. Each subsequent wrap is oriented in the same manner (i.e., surface 26 closer than surface 24 to the article to be insulated). When metallized layers are attached to both planar surfaces of the cell-containing layer (as shown in FIG. 3), the article can be wrapped such that either metallized layer is adjacent to the article. Even for this embodiment, however, it will generally be preferred that the cell-containing side of layer 16 is close to the article to be insulated than metallized layer 12. Such a configuration should provide somewhat superior insulating properties.

Figure 4:
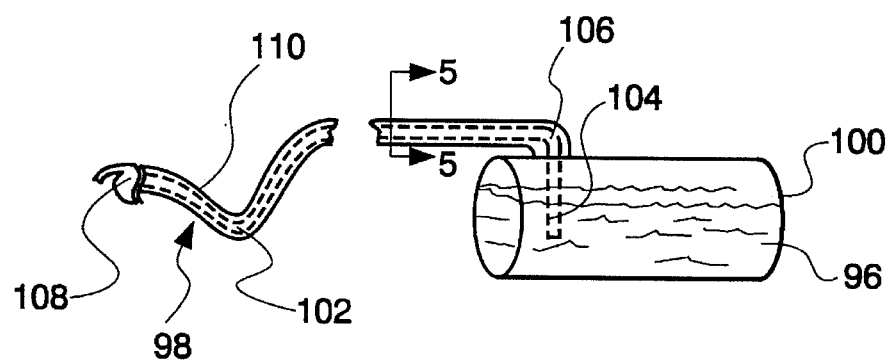
FIG. 4 generally illustrates an insulated hose assembly for delivery of a cryogenic liquid using the insulating sheet-like material of FIG. 1.

FIG. 4 generally illustrates the insulating material of this invention used in a delivery or transfer system for a cryogenic liquid such as liquified natural gas. Liquified natural gas (or other cryogenic liquid) 96 is pumped from storage tank 100 through line 104, coupler 106, flexible hose 102, and nozzle 108 to the desired receptacle (not shown). For transfer of cryogenic liquids, the flexible hose 102 is preferably a convoluted stainless steel hose with a stainless steel overbraid. The flexible hose 102 is wrapped at least twice, and preferably four or five times, with the insulating material of this invention (see FIGS. 1, 2, and 3) to provide the insulated hose 98. The outside surface 110 of the insulated hose 98 is formed by surface 24 of the metallized thermoplastic layer 12 (see FIGS. 1 and 2) or by either surface 24 of the metallized thermoplastic layer 12 or surface 30 of metallized thermoplastic layer 28 (see FIG. 3).

As suggested by FIG. 4, the insulating material of this invention can be used to insulate articles other than a flexible hose. For example, coupler 106 as well as that portion of line 104 extending outside tank 100 in FIG. 4 are also insulated using the same insulating material in the same manner. One of the advantages of the present method is that odd-shaped articles or articles with irregular surfaces can be insulated while still providing a relatively smooth finished surface 110 since the gas-filled cells can be easily distorted during application. Preferably, the insulating material of the present invention is simply wrapped in multiple layers around the article to be insulated to provide the desired thickness of insulation. If desired or necessary, however, the insulation can be applied using other techniques (e.g., cutting the insulation to the desired shape and layering upon the surface to be insulated) or combination of such techniques so long as suitable layers of the sheet-like insulating material are provided. For purposes of this invention, "wrap" or "wrapping" is intended to include other such application techniques.

Figure 5:
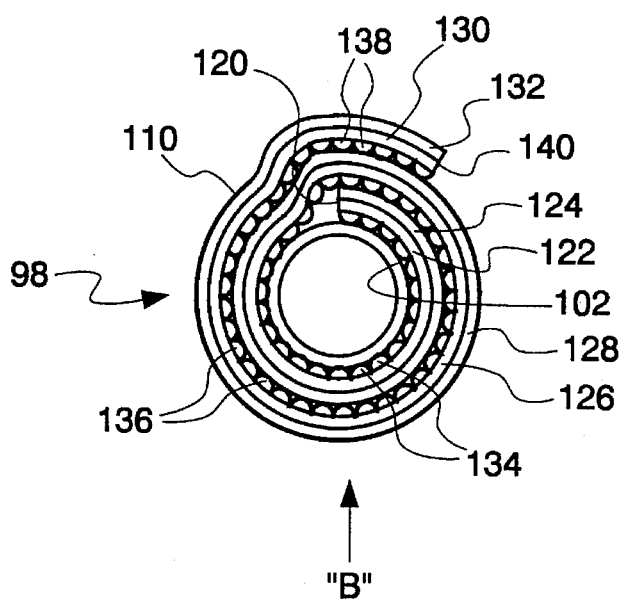
FIG. 5 is a cross-sectional view of the insulated hose in FIG. 4 at line 5—5.

In the practice of this invention, the flexible hose 102 is wrapped with at least two layers, and preferably four or more layers, of the insulating material 10. With insulating material 10 having only one metallized layer, the material is wrapped so that the gas-filled cells 18 are adjacent to the hose 102. The resulting wrapped hose 98 is best illustrated in FIG. 5 where flexible hose 102 is wrapped with two complete wraps and a partial third wrap of the insulating material of this invention. Beginning at point 120, the flexible hose 102 is wrapped with a first layer or wrap of insulating material having gas-filled cells 134 directly adjacent and essentially in contact with the exterior of the hose. The first wrap has a first thermoplastic layer 122 containing the gas-filled cells 134 and a second metallized thermoplastic layer 124. (To reduce complexity in FIG. 5, the glue layer between layers 122 and 124—and the corresponding glue layers in the later wraps—are not shown.) The second layer or wrap also has a first thermoplastic layer 126 containing gas-filled cells 136 and a second metallized thermoplastic layer 128. The partial third layer or wrap, which ends at 140, also has a first thermoplastic layer 130 containing gas-filled cells 138 and a second metallized thermoplastic layer 132. Subsequent layers or wraps of insulating material would be added in the same manner. Insulating material having two metallized layers (as shown in FIG. 3) can be applied in the same manner except that either metallized surface can be adjacent to the article to be insulated. As noted above, however, it is generally preferred that the metallized layer bonded directly to the gas-filled cells is adjacent to the article to be insulated when using the insulating material of FIG. 3.

The outside surface 110 (except for the end or termination point 140 of the third wrap) of the wrapped hose 98 in FIG. 5 consists of the metallized thermoplastic material. Using the insulating material of FIGS. 1 and 2, the gas-filled cells (134 in the first wrap, 136 in the second wrap, and 138 in the third wrap) are located closer to the flexible hose than the associated (i.e., bonded) metallized thermoplastic layer (124, 128, and 132, respectively). (When using the insulating material 10 having thermoplastic layers 12 and 28 on either side of the cell-containing layer 16 as shown in FIG. 3, either thermoplastic layer 12 or 28 can be adjacent to the hose or article to be insulated.) When applying the insulating material, the starting end 120 may be tacked to the flexible hose 102 using adhesive, tape, or the like. The starting end 120 could also be held in place by friction supplied by subsequent wraps or layers of the insulating material. The terminating end 140 can also be held in place, thereby preventing unraveling, by using adhesive, tape or the like. The terminating end 140 could also be held in place by further wrapping or covering the hose 98 with a flexible protective material or encasing the hose 98 within a sleeve or covering of a flexible protective material such as leather, fabric, or knitting material (see below and FIG. 7). Such protective material would also protected the insulated hose assembly from mechanical damage from, for example, dragging the assembly over concrete floors. An adhesive layer 38 with release sheet 36, as shown in FIG. 3, can also be used to attach the insulating material 10 to the article and other layers of insulating material.

Figure 6:
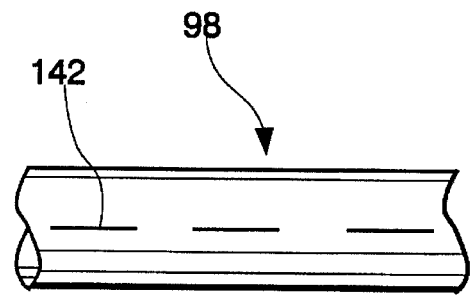
FIG. 6 is a partial, bottom view of a section of an insulated hose of this invention having drainage openings or slits in the insulating member. The bottom view taken in this Figure is indicated by the arrow labeled "B" in FIG. 5.

It is also preferred to provide drainage openings (i.e., holes, slots, or slits) in the insulating material so that any water that condenses within the insulating material can drain out once the temperature of the wrapped hose rises above the freezing point of water. FIG. 6 shows such drainage slits 142 in wrapped hose 98. The drainage slits 142 are generally parallel to the length of the hose are preferably located at the bottom of the wrapped hose (i.e., in the general location "B" in FIG. 5) so that liquid water can gravity drain from the wrapped hose. Preferably such drainage holes, slots, or slits are sufficiently small so that the insulating property of the insulating material is not significantly reduced. Preferred drainage holes can be prepared by simply intermediately slitting the insulating material with, for example, a knife or razor blade along its length. The drainage holes may extend through only the outside layer or wrap of insulating material or through multiple layers. Such slots could be cut in the finished wrapped hose (as shown in FIG. 5) or could be cut in individual wraps as they are placed on the hose. For example, slits could be cut in the first layer as it was applied to the hose, then the second layer could be applied with slits then cut therein, and similarly with each subsequent layer up to and including the final layer. Cutting slits in each individual layers will allow for "staggered" slits which will allow for drainage with minimal loss of insulating properties. But, as noted, slits can be formed in the completely wrapped and insulated hose through one or more layers of the insulating material without significant loss of insulating properties so long as the slits are sufficiently narrow. Generally, drainage holes less than about 1/8 inch in diameter are acceptable; preferably such holes are less than about 1/16 inch in diameter. Slots or slits less than about 1/16 inch across and less than about 1 inch in length are acceptable; preferably such slots or slits are less than about 1/64 inch across and less than about 1/2 inch in length. Most preferably such slots or slits are essentially self-sealing (i.e., the edges of the slits essentially touch each other along the edge of the slit) but allow liquid water to drain from the insulated hose.

Figure 7:
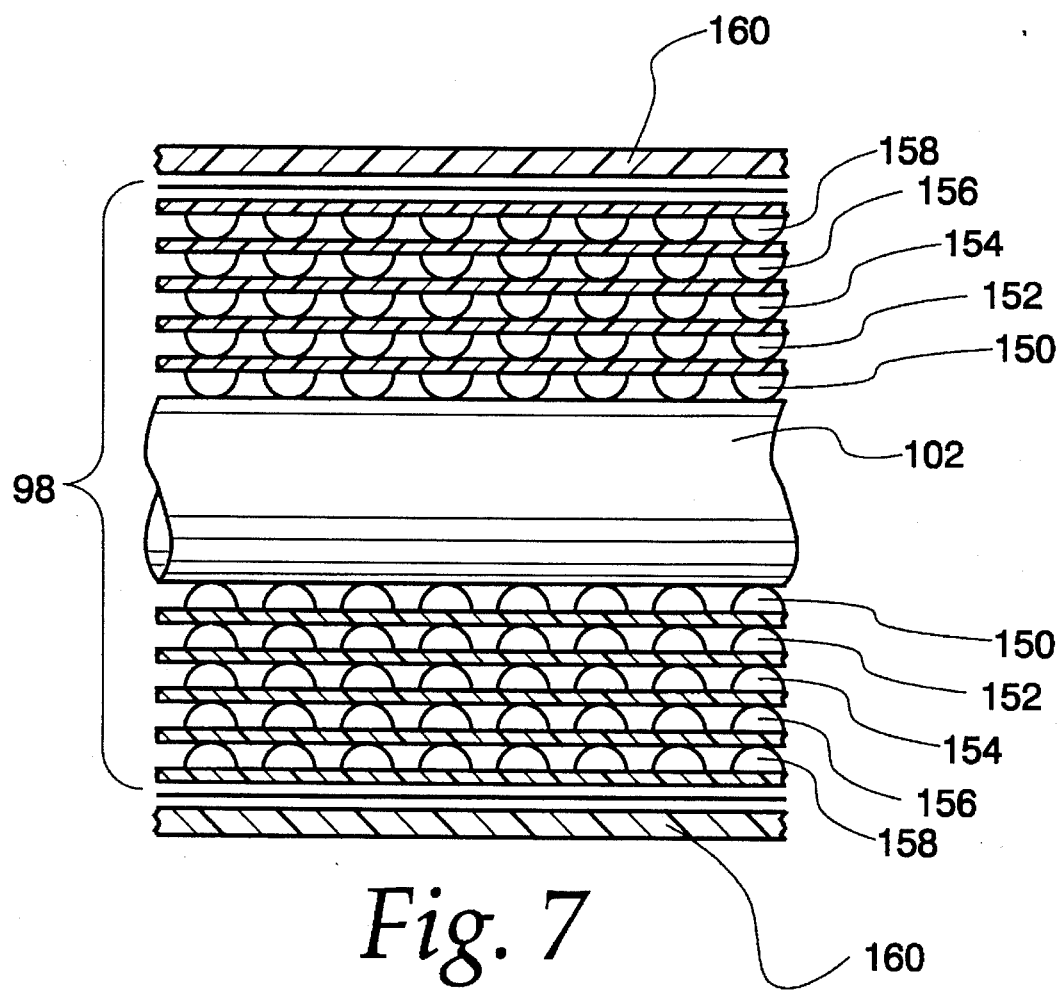
FIG. 7 is a cross-sectional, lengthwise view of a hose insulated with the sheet-like material of FIG. 1 and encased in a protective sleeve.

Preferably, the wrapped hose 98 is further wrapped with or contained within a flexible protective material to form a sheath or covering for the wrapped hose. FIG. 7 illustrates a hose 102 wrapped with five layer of the insulating material of this invention: 150 is layer one, 152 is layer two, 154 is layer three, 156 is layer four, and 158 is layer five. The wrapped hose 98 is then encased in protective sleeve 160. This protective material should protect the wrapped hose 98 from abrasions, cuts, and the like which will tend to degrade the insulating material. Preferably, the protective material will provide additional insulation value, retain the flexibility of the wrapped hose, and provide additional comfort and protection for the operator handling the hose. Suitable protective materials include leather, fabric, knitted material, and the like.

Leather is a preferred protective material for finally wrapping or encasing the wrapped hose 98 since it provides protection, additional insulation, and added comfort and safety for the operator. Relatively thin (about 2 to 6 inches wide) strips of leather can be wrapped around the wrapped hose 98 in an overlapping manner to form a covering with the desired flexibility. The ends of the strips of the protective member can be secured using convention means (i.e., adhesive bonding, taping, tying, or the like). The wrapped hose 98 can also be encased within a protective sleeve (e.g., a leather sleeve). If desired, the leather or other protective material may have relatively small holes (i.e., less than about 1/8 inch in diameter) or slits (i.e., less than about 1/16 inch across and less than about 1/2 inch in length) located near the bottom of the hose (i.e., in close proximity to the drainage slits 142 as shown and discussed above in regard to FIG. 6) to allow water condensed within the insulation (if any) to drain away when the temperature is above the freezing point of water. Generally, such drainage holes are not needed for protective covering made from materials (e.g., fabric or knitted material) through which liquid water can easily pass.

The gas-filled cell layer 16 is made from thermoplastic material using conventional techniques. Suitable thermoplastic materials for the cell-containing layer include polyethylene, polypropylene, and the like. The preferred thermoplastic material for this layer is polyethylene. The gas-filled chambers can be prepared by heat sealing a first polyethylene film which is formed to the desired cell shapes to a second, essentially flat polyethylene film. The resulting gas-filled cell layer is relatively thick due to the presence of the gas-filled cells. The cells may be filled with any suitable gas; generally air-filled cells are preferred. The size and shape of the gas-filled cells is not critical. Generally, spherical cells or cylindrical cells such as illustrated in FIG. 2 are preferred because of the ready availability of such materials (i.e., the so-called bubble pack materials). Generally, the gas-filled cells will have a base diameter of about 1/4 to 1 inches and preferably about 1/4 to 5/16 inches, and a height of about 1/8 to 3/8 inches and preferably about 1/8 to 3/16 inches. Gas-filled cells larger or Smaller can, if desired, also be used.

The metallized thermoplastic layer is bonded to the smooth side (i.e., the side opposite to the cells) of the gas-filled cell layer. An optional metallized thermoplastic layer may also be bonded to the cell-containing side of the gas-filled cell layer. The metallized thermoplastic layer (12 in FIG. 1) or layers (12 and 28 in FIG. 3) can be formed from thermoplastic materials to which have been added finely-divided metal particles or from thermoplastic materials coated with a metallized layer. Coating operations can include conventional vapor or spray deposition techniques or bonding a thin metallic film to a thermoplastic film using appropriate adhesives. The actual method used to prepare the metallized thermoplastic layer or layers is not critical. The metallized thermoplastic layer is reflective to thermal radiation and, therefore, acts as a thermal radiation barrier. Suitable thermoplastic materials include polyesters, polyimidies, and the like. A preferred metallized thermoplastic layer is formed from aluminized polyester film. Generally the metallized thermoplastic layers are about 0.1 to 5.0 mils thick and preferably about 0.25 to 1.0 mils thick.

The gas-filled cell thermoplastic layer and the metallized thermoplastic layer are held together using conventional adhesives. The actual adhesive selected will, of course, depend on the thermoplastic materials used for each layer. Adhesives suitable for bonding the preferred layers (i.e, polyethylene bubble film to aluminized polyester) include 3M Super 77, Goodyear Plyobond, and the like, with 3M Super 77 being especially preferred. Other conventional adhesives can, of course, be used. Generally, contact, chemically-activated, or thermal-activated adhesives will be preferred over pressure sensitive adhesives. Pressure sensitive adhesives can be used, however, so long as the pressure required to form the bond will not burst a significant number of the gas-filled cells. Generally the adhesive layer is about 0.25 to 1.0 mils thick.

The following examples are intended to further illustrate the invention and not to limit it.

EXAMPLE 1

The insulating material of this invention was prepared by bonding 0.5 mil aluminized polyester film to the smooth side of a polyethylene bubble pack material. The polyethylene bubble pack material had air-filled cells of about 3/8 inch diameter and about 3/16 inch in height. The overall thickness of the polyethylene bubble pack material (i.e., as measured through an air-filled cell) was about 3/16 inch; the thickness of the polyethylene film between the cells was about 3.7 mils. The adhesive used to bond the two layers was 3M Super 77 which was applied to the both the polyester layer and the smooth surface of the bubble layer. Bonding was affected by bring the adhesive layers on the two surfaces into contact.

Several samples of wrapped hose were prepared using pipe wrapped with four and five layers of this insulating material. Drainage holes were provided by cutting slits lengthwise in the bottom of the insulating material in the wrapped hose using a knife. Generally, the slits were about ½ inch in length, with about four slits per foot of hose, and extending, on average, through about all layers of insulating material. The resulting samples were then submerged in water to simulate complete water saturation. Once removed from the water, about 75 weight percent of the water contained within the insulation gravity drained from the insulation within a few seconds. Essentially all the water (i.e., at least about 90 weight percent) drained from the insulation within a few minutes.

A 4.5 inch outer diameter tube was insulated with 10 layers of the flexible insulating material. The insulated assembly was about 8 inches in diameter. Laboratory tests indicated that the thermal conductivity of the insulating material was in the range of about 0.01 to 0.013 BTU/(hr.ft.°F.). The observed thermal conductivity is comparable to the values obtained with similar thicknesses of rigid polystyrene or polyurethane foam insulation.

EXAMPLE 2

Using the insulating material described in Example 1, a cryogenic hose (i,e., convoluted stainless steel hose) was wrapped with four layer of the insulating material. The wrapped hose was inserted into a leather sleeve made from number 2 Diamond Tan cowhide (6–7 ounce). The leather-sheathed, insulated hose was used in a conventional liquified natural gas transfer station. Even when repeatedly dragged on a concrete floor, the hose showed no signs of deterioration, loss of flexibility, or loss of insulating properties. Even after repeated use for transfer of liquified natural gas (at about −260°F.) there was no evidence of "frost spots" (i.e., water condensation) on the leather sleeve; the absence of such "frost spots" demonstrates the excellent insulating properties of the present insulating materials.

That which is claimed is:

1. A method for thermally insulating an article, said method comprising
   (a) wrapping the exposed surfaces of the article to be insulated with at least two wraps of a flexible sheet material having (1) a first thermoplastic layer having gas-filled cells formed in one planar surface and a relatively smooth surface as the second and opposite planar surface, (2) a second metallized thermoplastic layer, and (3) a bonding layer interdisposed between and directly contacting both the relatively smooth surface of the first layer and the second layer for bonding the first and second layers to each other, whereby the exposed surfaces of the article are wrapped with the flexible sheet material such that, for each wrap, the gas-filled cell surface of the first layer is located in closer proximity to the exposed surface of the article than the second layer bonded to that first layer; and
   (b) securing the flexible sheet material to hold the flexible sheet material in place around the article;
   whereby the article is insulated by one layer of gas-filled cells and one layer of metallized thermoplastic per each wrap of the flexible sheet material.

2. A method as defined in claim 1, wherein the article to be insulated is a flexible delivery or transfer hose suitable for transferring cryogenic liquids, the hose is wrapped with at least four wraps of the flexible sheet material, and the wrapped hose remains flexible.

3. A method as defined in claim 2, wherein a plurality of drainage openings are provided in the wrapped layers of flexible sheet material along the length of the wrapped hose such that liquid water may drain from the wrapped hose and such that the insulating properties of the wrapped layers of flexible sheet material are not significantly reduced.

4. A method as defined in claim 1, wherein the wrapped hose is covered with a flexible protective material to form a protective outer covering.

5. A method as defined in claim 2, wherein the wrapped hose is covered with a flexible protective material to form a protective outer covering.

6. A method as defined in claim 3, wherein the wrapped hose is covered with a flexible protective material to form a protective outer covering.

7. A method as defined in claim 4, wherein the flexible protective material is leather, fabric, or knitted material.

8. A method as defined in claim 5, wherein the flexible protective material is leather, fabric, or knitted material.

9. A method as defined in claim 6, wherein the flexible protective material is leather, fabric, or knitted material.

10. A method as defined in claim 1, wherein the flexible sheet material has an adhesive layer on a portion of the cell-containing surface of the first layer to assist in attaching the flexible sheet material to the exposed surface of the article or earlier wraps of the flexible sheet material.

11. A method as defined in claim 1, wherein the second layer is extended beyond the edges of the first layer and an adhesive layer is provided on the portion of the second layer extending beyond the edge of the first layer and on the same side of the second layer as the bonding layer, whereby the adhesive layer assists in attaching the flexible sheet to the exposed surface of the article or earlier wraps of the flexible sheet material.

12. A method as defined in claim 11, wherein the adhesive layer is protected by a release sheet which is removed when the flexible sheet material is applied to the article.

13. A method for thermally insulating an article, said method comprising
   (a) wrapping the exposed surfaces of the article to be insulated with at least two wraps of a flexible sheet material having (1) a middle thermoplastic layer having gas-filled cells formed in one planar surface and a relatively smooth surface as the second and opposite planar surface, (2) a first metallized thermoplastic layer bonded directly to the relatively smooth surface of the middle layer, and (3) a second metallized thermoplastic layer bonded directed to the cell-containing surface of the middle layer, whereby the exposed surfaces of the article are wrapped with the flexible sheet material; and
   (b) securing the flexible sheet material to hold the flexible sheet material in place around the article;
   whereby the article is insulated by one layer of gas-filled cells and two layers of metallized thermoplastic per each wrap of the flexible sheet material.

14. A method as defined in claim 13, wherein the article to be insulated is a flexible delivery or transfer hose suitable for transferring cryogenic liquids, the hose is wrapped with at least four wraps of the flexible sheet material, and the wrapped hose remains flexible.

15. A method as defined in claim 14, wherein a plurality of drainage openings are provided in the wrapped layers of flexible sheet material along the length of the wrapped hose such that liquid water may drain from the wrapped hose and such that the insulating properties of the wrapped layers of flexible sheet material are not significantly reduced.

16. A method as defined in claim 13, wherein the wrapped hose is covered with a flexible protective material to form a protective outer covering.

17. A method as defined in claim 14, wherein the wrapped hose is covered with a flexible protective material to form a protective outer covering.

18. A method as defined in claim 15, wherein the wrapped hose is covered with a flexible protective material to form a protective outer covering.

19. A method as defined in claim 16, wherein the flexible protective material is leather, fabric, or knitted material.

20. A method as defined in claim 17, wherein the flexible protective material is leather, fabric, or knitted material.

21. A method as defined in claim 18, wherein the flexible protective material is leather, fabric, or knitted material.

22. A method as defined in claim 13, wherein the flexible sheet material has an adhesive layer on a portion of the outer surface of either the first or second metallized thermoplastic layer to assist in attaching the flexible sheet material to the exposed surface of the article or earlier wraps of the flexible sheet material.

23. A method as defined in claim 13, wherein the either the first or second metallized thermoplastic layers or both first and second metallized thermoplastic layers are extended beyond the edges of the middle thermoplastic layer and an adhesive layer is provided on the portion of the first or second layers extending beyond the edge of the middle layer, whereby the adhesive layer assists in attaching the flexible sheet to the exposed surface of the article or earlier wraps of the flexible sheet material.

24. A method as defined in claim 23, wherein the adhesive layer is protected by a release sheet which is removed when the flexible sheet material is applied to the article.

25. A method for thermally insulating a flexible hose suitable for transferring cryogenic liquids, said method comprising (a) wrapping the hose with at least two wraps of a flexible sheet material having (1) a first thermoplastic layer having gas-filled cells formed in one planar surface and a relatively smooth surface as the second and opposite planar surface, (2) a second metallized thermoplastic layer, and (3) a bonding layer interdisposed between and directly contacting both the relatively smooth surface of the first layer and the second layer for bonding the first and second layers to each other; and (b) providing a plurality of drainage openings in the flexible sheet material along the length of the wrapped hose such that liquid water may drain from the wrapped hose and such that the insulating properties of the wrapped flexible sheet material are not significantly reduced;

whereby the article is insulated by one layer of gas-filled cells and one layer of metallized thermoplastic per each wrap of the flexible sheet material.

26. A method as defined in claim 25, wherein the wrapped hose is covered with a flexible protective material to form a protective outer covering.

27. A method as defined in claim 26, wherein the flexible protective material is leather, fabric, or knitted material.

28. A method for thermally insulating a flexible hose suitable for transferring cryogenic liquids, said method comprising (a) wrapping the hose with at least two wraps of a flexible sheet material having (1) a middle thermoplastic sheet-like layer having gas-filled cells formed in one planar surface and a relatively smooth surface as the second and opposite planar surface, (2) a first metallized thermoplastic layer bonded directly to the relatively smooth surface of the middle layer, and (3) a second metallized thermoplastic layer bonded directed to the cell-containing surface of the middle layer; and (b) providing a plurality of drainage openings in the flexible sheet material along the length of the wrapped hose such that liquid water may drain from the wrapped hose and such that the insulating properties of the wrapped flexible sheet material are not significantly reduced;

whereby the article is insulated by one layer of gas-filled cells and two layers of metallized thermoplastic per each wrap of the flexible sheet material.

29. A method as defined in claim 28, wherein the wrapped hose is covered with a flexible protective material to form a protective outer covering.

30. A method as defined in claim 29, wherein the flexible protective material is leather, fabric, or knitted material.

* * * * *